C. J. WALSER.
Horse-Detacher.
No. 207,143.   Patented Aug. 20, 1878.
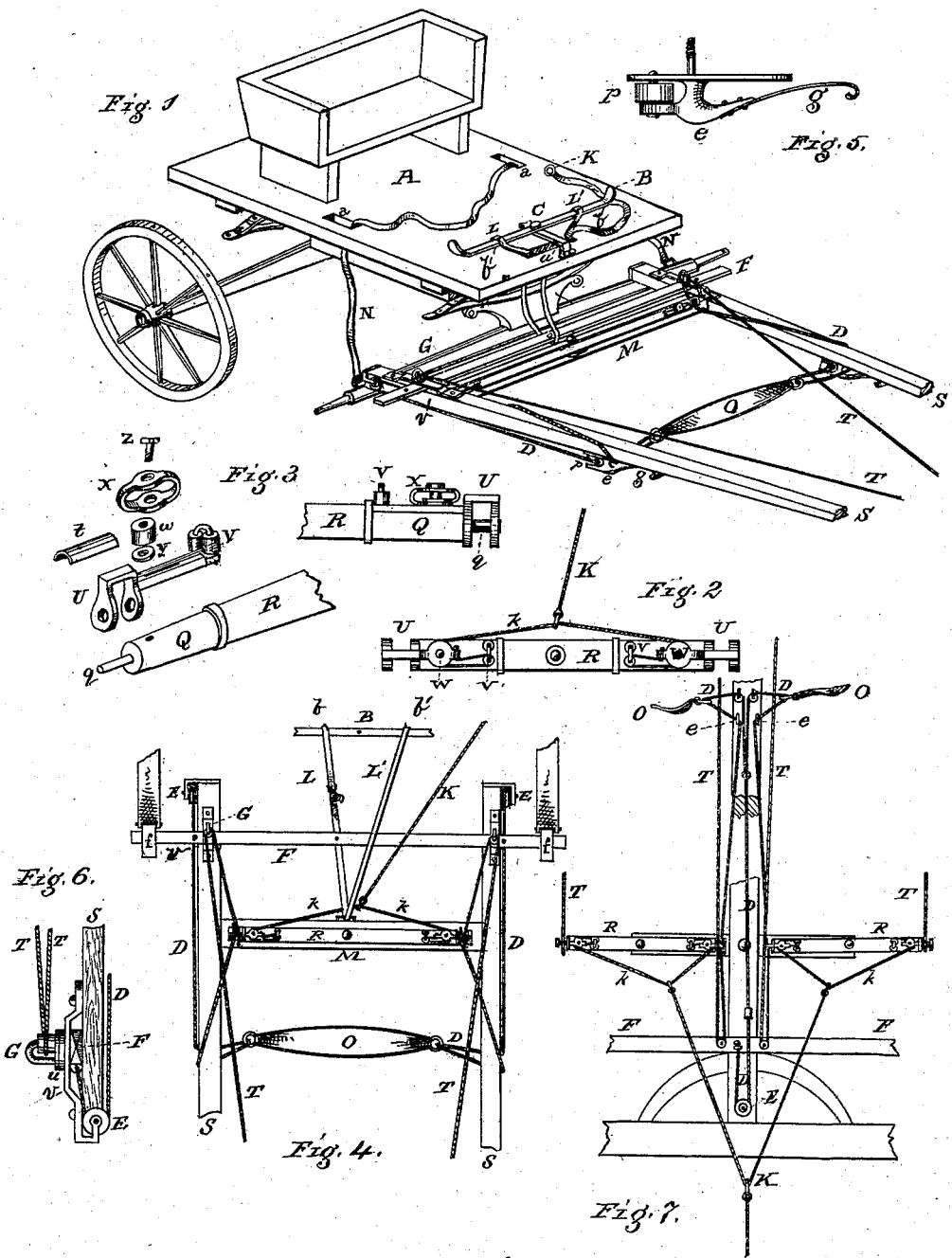
WITNESSES:
Jacob Stauffer
W. B. Wiley
Chas J. Walser INVENTOR
ATTORNEY

UNITED STATES PATENT OFFICE.

CHARLES J. WALSER, OF LANCASTER, PENNSYLVANIA.

IMPROVEMENT IN HORSE-DETACHERS.

Specification forming part of Letters Patent No. 207,143, dated August 20, 1878; application filed May 22, 1878.

*To all whom it may concern:*

Be it known that I, CHARLES JOSEPH WALSER, of Lancaster, in the county of Lancaster and State of Pennsylvania, have invented certain Improvements in Devices for Detaching Horses from Vehicles, and to control the movement when detached, of which the following is a specification:

The object of this invention is not only to disengage a fractious or ungovernable horse, but to guide and check the motions of the vehicle after the horse is disengaged, to sustain the shafts, as well as to prevent accidents in going down hill or under the momentum of rapid motion, as in my former patent dated August 31, 1875, No. 167,205, greatly simplified, and more practical.

The accompanying drawings illustrate the combined arrangement, as well as the several parts in detail, with like letters of reference to the same parts, which, together with a brief description, will enable those skilled in the art to make and use the same, and in which—

Figure 1 is a perspective view, in part, of a vehicle with the devices in place. Fig. 2 shows the device for disengaging the traces in place on the single-tree and the operating-straps attached. Fig. 3 shows the details of the device for releasing the traces from the single-tree; Fig. 4, a plan view of the shafts, breech-band, traces, and brake-bar, &c. Fig. 5 shows the combined pulley and backing-strap spring-hook; Fig. 6, the bridge-piece over the brake-bar, with the appliances to operate. Fig. 7 shows a plan for duplicating the same arrangement should it be desirable to apply it to a pole and two-horse vehicle. The same elements are employed adapted to the pole and double-tree.

To explain the apparent complication of straps and appliances shown in their relation and arrangement with the bottom and shafts of an ordinary vehicle, I will refer to them in order, as shown in Fig. 1, referring for the fuller description to the separate figures.

The strap N is continuous, the ends (attached to the inner side of the axle of the front wheels, near the hub) entering through a slot, $a$, on each side in the bottom, A, of the vehicle, and convenient to the hand of the driver. The object of this strap is to guide the motions of the vehicle, after the horse is detached, when under headway or going down hill, and supplies the place of my segmental wheel N in my previous patent.

B is a vibrating foot-lever, affixed centrally by a pivot on a raised bracket, C, over a central opening, $a'$, in the bottom, A, of the vehicle, inside near the dasher, (which latter is not shown.) The object of this foot-lever is to operate the brake-bar F. That side for the right foot has a strap, or its equivalent, attached at $b$. This strap L is made adjustable by a buckle, and the connection is secured to the brake-bar by a rivet; thence the continuous or combined strap $L'$ is passed through a loop affixed centrally to the cross-piece M, (which unites the shafts S,) and is carried up through the forward slot, $a'$, to the opposite arm of the foot-lever B, and the end attached at $b'$. Thus a push with the right foot on that end of the lever will draw the brake-bar with its rubber $f$ against the wheels, while the tension of the strap supports the shafts, as also in releasing the brake-bar, by pushing against the opposite arm of said foot-lever. Thus, by this simple arrangement, the brake can be operated by the feet, while the hands may be engaged to guide the vehicle. At the same time the shafts cannot strike the ground when the horse is released.

It being desirable to relieve the horse in going down hill, and yet relieve the driver from attention to the brake, I have devised an automatic connection with the brake-bar, so that when the horse holds back the brakes are applied at the same time. This I accomplish by means of a keeper or bridge-piece, $v$, affixed to the back portion of each shaft, and under which the bar is drawn back and forth, resting on the shafts. This brake-bar may be set back to lock the hind wheels in like manner by a keeper and lengthening the straps. Fig. 6 shows this bridge-piece or keeper $v$.

F is the brake-bar, to which a strap, D, is attached and carried back over a pulley, E, and forward along the shaft to a pulley, $p$, connected with the holdback-hook $e$ under the shafts, (shown by Fig. 5,) thence from said pulley through the ring usually on the breech-band $o$ of harness, then back through the open hook $e$, and thence carried and attached to the pin $q$ on the single-tree on each side. Fig. 4 shows said strap and trace connection with the brake-bar and single-tree.

The connection of the strap D with the breech-band and brake-bar is to relieve the horse from the pressure of a load in going down hill by acting automatically when the horse simply holds back. It also tends to lock the wheels. In order, however, to draw the brake off when a forward pull is given, I devised several plans. The foot-lever B in the vehicle will answer readily, as also when backing the horse, to prevent the brakes from acting.

I show also an automatic connection with the trace T and the brake-bar, the end of the trace being attached to the single-tree after being carried back around a roller on the leg of a loop, G, which leg enters through a long slot made in the upper face of the keeper $v$, and is firmly secured to the brake-bar F, and moves with it. A metallic and rubber washer, $u$, covers the slot to hold it firmly and prevent rattling. The forward draft relieves the brake or draws it forward by the action of the trace T. Holding back will pull the brake back by the action of the strap-connection D, Fig. 4. The ends of both T and D are held between the double-ended sliding plate U $v$, and on the pin $q$ of the single-tree R, and both dislodged at once.

My improvement over my former patent to disengage the traces, dated November 28, 1876, No. 184,934, I have again improved, so that the entire arrangement is simplified and more satisfactory to produce the combined results upon the vehicle and disengagement of the horse as originally contemplated, but found impracticable in a great degree. I now use a socket, Q, into which the ends of the single-tree are screwed. These sockets may be provided with a flange or rounded edge at their open end. A screw-thread is cut into the solid portion for the pivot-bolt Z, that holds the roller or pulley W between a double loop-ended clamp, X, Fig. 3. This bolt also penetrates a plate, $t$, that covers the oblong slot, through which the bolt also passes and holds the pulley W and appliances in place. The unshifting or dislodging plate having the oblong slot is concave, and fits and slides to and fro on the socket Q and beneath the covering-plate $t$, to exclude dirt from entering the slot in which it has its motion. This plate on its outer end is provided with two enlarged limbs, U, perforated to receive the pin $q$ on the end of the socket Q, on which pin the straps D and traces T are held between said two limbs or double holder U when the plate is pushed back on the socket. For unshifting, there is provided a loop, V, each leg surrounded by a roller and affixed on the inner end of the sliding plate.

Fig. 2 shows that the end of a strap, $k$, is attached to the inner loop of the pulley-holder X on each side, then inward and through the loop V and forward around the pulley or roller W, and between it and the outer loop of the holder X, from the one side continuous to the other. I show this strap $k$ passed through a ring on a pull-strap, K, which enters the vehicle through $a'$ in the bottom, which strap may be suspended to the inside of the dasher on vehicles convenient to the hand, differing in construction from my former devices, but having the same object in view.

The pulley W may be formed with an annular chamber for a rubber washer, to act as a spring seated on a plano-convex metallic washer, $y$, that fits in the bottom, to lessen the friction of the motions of the pulley, and yet hold it in place and prevent rattling.

The operation for dislodging is self-evident. A central pull on the strap $k$, having the two ends fixed to the stationary pulley-holders X on each end of the single-tree, and, going back around the roller V on the end of the slotted plate, it draws the said plate forward projecting the U-head beyond the pin on the single-tree, carrying the strap and trace between said U with them, so as to become disengaged simultaneously and liberate the horse. As it may be desirable to use an ordinary backing-strap with the breech-band, I have a flat spring, $g$, on the hook $e$, Fig. 5, which, while it prevents displacement, will yield and allow the strap to be drawn out by a forward pull upon it.

I am not aware that any device or devices, substantially as herein set forth for the purpose mentioned, were ever used or known by others. Being sole owner of my former patents, my object is to supply their place by this and abandon them.

Therefore, what I claim in the combined devices employed as my invention is—

1. In combination with the pulley W, the double-looped pulley-holder X, the covering-plate $t$, and the sliding slotted detaching-plate, when said plate is provided at one end with the perforated double head-piece U, and at the other with a vertical loop, V, having rollers, the whole applied and operated substantially as and for the purpose mentioned.

2. In combination with the disengaging device on the single-tree Q, U, X, and V, the extended trace T and strap D, connected with the brake-bar F, substantially as and for the purpose specified.

3. In combination with the device for disengaging the horse from the shafts, as aforesaid, the straps L L' attached to the foot-lever B, brake-bar F, and cross-piece M, which unites the shafts S, the whole arranged and operating as and for the purpose specified.

CHAS. J. WALSER.

Witnesses:
JACOB STAUFFER,
WM. B. WILEY.